April 19, 1927.
J. F. CULLISON
CORN KNIFE
Filed April 1, 1925
1,625,713
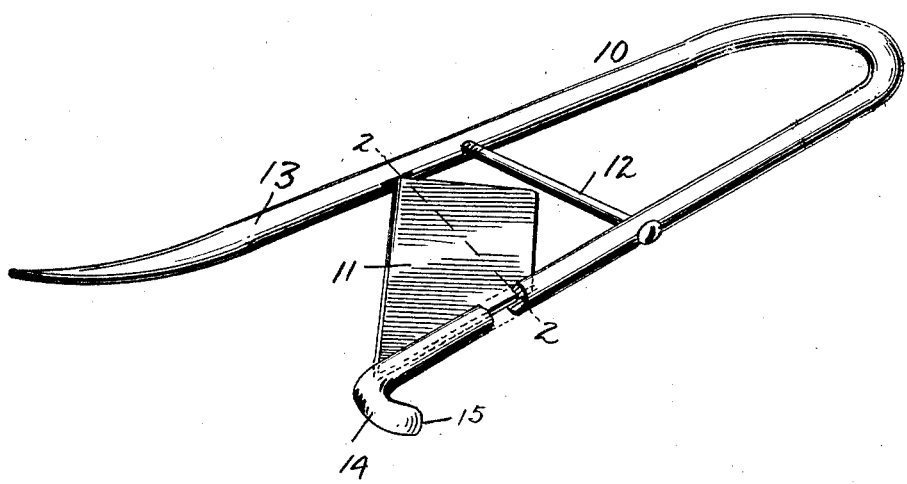
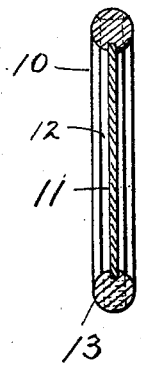
Inventor
John F. Cullison
By Chas. J. Williamson
Attorney Patented Apr. 19, 1927.

1,625,713

UNITED STATES PATENT OFFICE.

JOHN F. CULLISON, OF OBERLIN, KANSAS.

CORN KNIFE.

Application filed April 1, 1925. Serial No. 19,940.

The object of my invention is to produce a knife having special advantages in the cutting of broom corn and my invention consists in whatever is described by or is included in the terms or scope of the appended claim.

In the annexed drawings:

Fig. 1 is perspective view of a knife embodying my invention;

Fig. 2 is a cross section on the line 2—2 of Fig. 1.

Referring in detail to what is shown in the drawings, my knife consists of a handle, 10, formed of iron or other suitable material which is U-shape, and a cutting blade, 11, which is held in an oblique position between the legs of the handle with the cutting edge extending obliquely towards the opening between the legs. Each leg has a groove at its inner side to receive and hold the blade at opposite edges and the two legs are clamped upon the blade to securely hold it by means of a transverse bolt or screw, 12, which extends through aligning holes in the two legs, one hole being threaded to engage the threads on the bolt. This arrangement provides a simple and yet dependable means for removably holding the blade to the handle so that when necessary the blade may be removed for sharpening and for putting in a new blade.

The handle leg, 13, is longer than the other and preferably curves outward from the blade and has its end or extremity pointed and such leg forms an acute angle with the cutting edge of the blade and thus facilitates the cutting stroke by guiding the corn stalk. The other and shorter leg of the handle has a rounded end, 14, with an out-turned toe, 15.

In using my knife the rounded end of the handle is held in the hand with the leg, 13, with the pointed end downward, the shorter leg being uppermost and the knife blade, 11, is pushed against the corn. The rounded end, 14, of the short leg prevents it catching upon the blades of corn and the pointed out-curved end of the longer leg serves to guide the corn blades to the knife.

What I claim is:

A broom corn knife comprising a handle, having legs and a blade situated between the legs, with its cutting edge extending obliquely and providing an angular space between it and one of the legs, said leg being longer than the other leg and out-turned from the other leg and being of tapering form at its free end, and said other leg being blunt.

In testimony whereof I hereunto affix my signature.

JOHN F. CULLISON.